May 14, 1940.    L. RICEFIELD    2,200,641
COUPLING
Filed Aug. 15, 1938    3 Sheets-Sheet 1
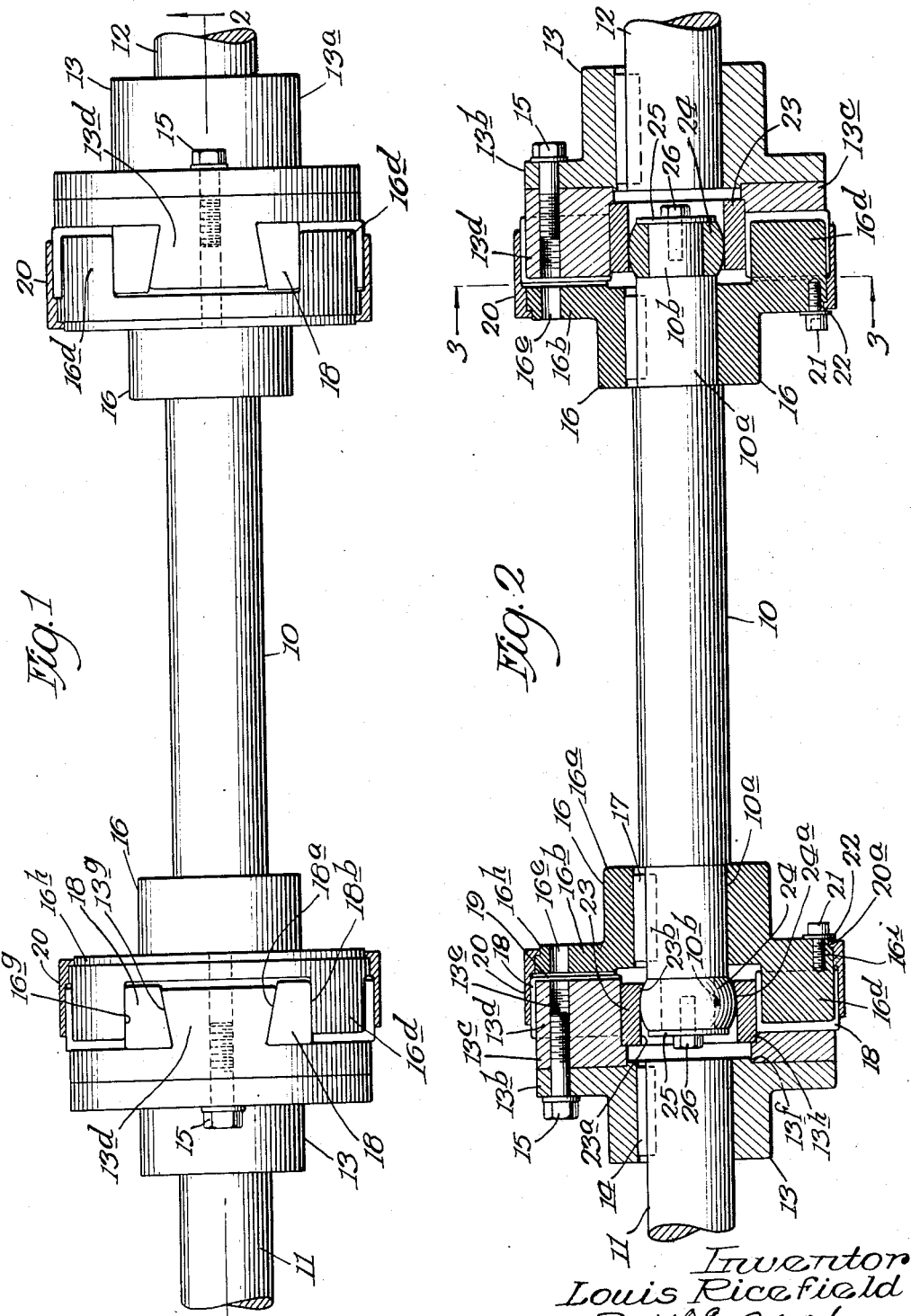

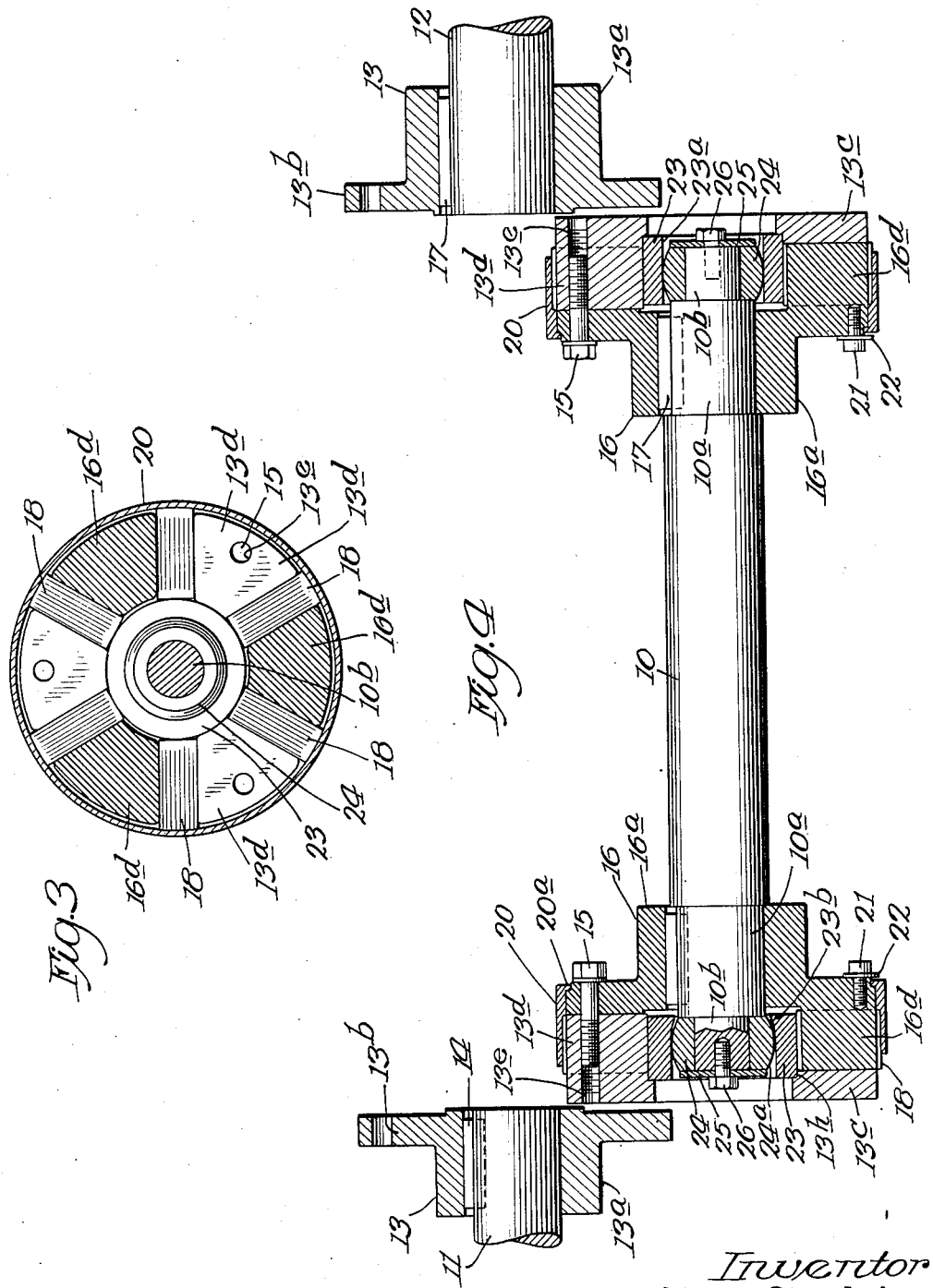

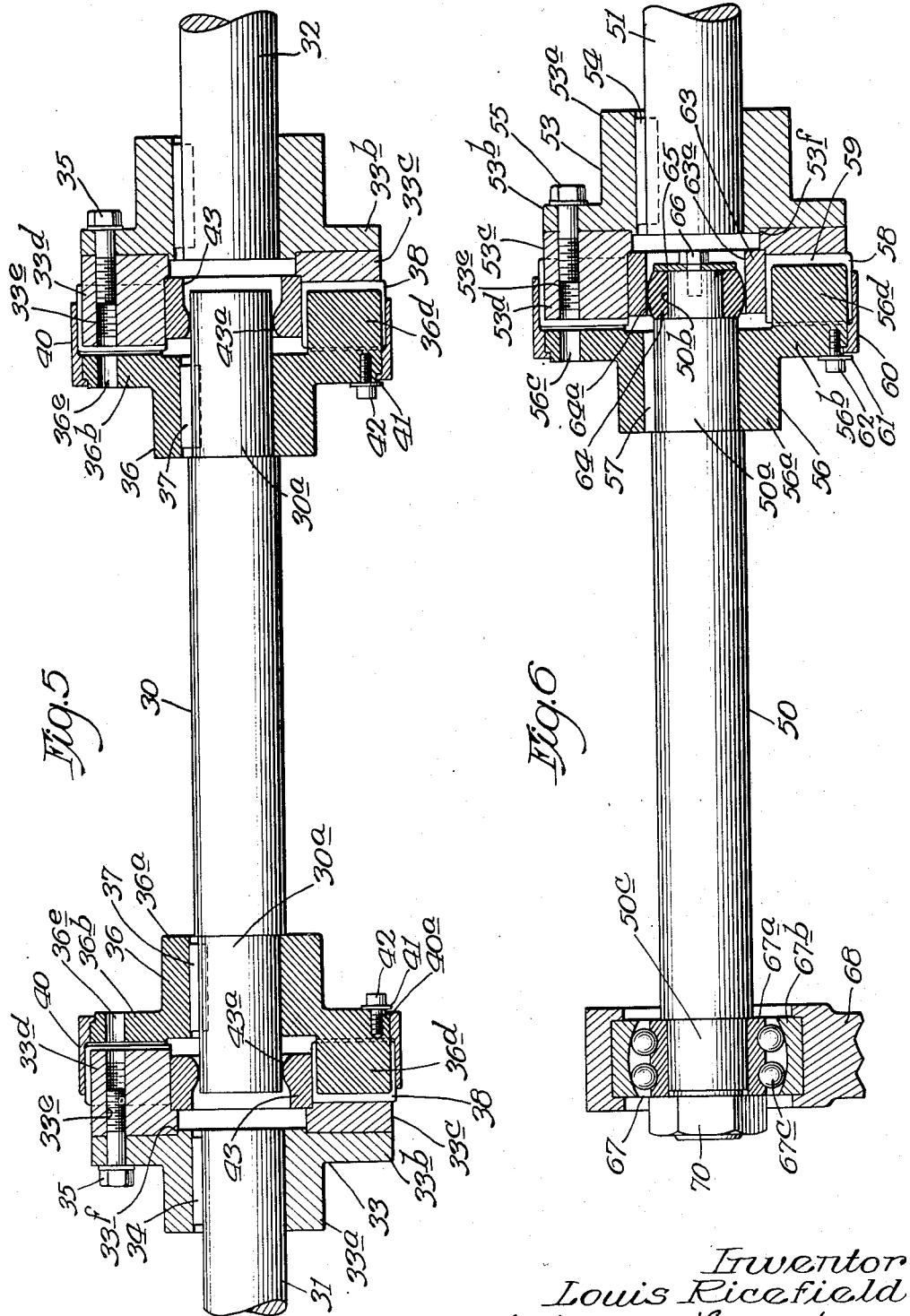

Patented May 14, 1940

2,200,641

UNITED STATES PATENT OFFICE 2,200,641

COUPLING

Louis Ricefield, Oak Park, Ill.

Application August 15, 1938, Serial No. 224,848

6 Claims. (Cl. 64—14)

This invention relates to improvements in couplings and its purpose is to provide an improved device adapted to be used for connecting substantially aligned shafts and to permit angular misalignment, relative lateral displacement, and relative endwise movement of said shafts.

The principal object of the invention is to provide an improved coupling adapted to permit a much greater degree of misalignment between two connected shafts than can be compensated for by the couplings commonly in use. A further object is to provide an improved coupling device adapted to be used in connecting two shafts which are separated to such an extent that they can not be connected by a single coupling. Still another object of the invention is to provide an improved coupling adapted for use in connecting two shafts and having means for supporting one of the shafts on the other during its rotation so that one or more of the usual bearings for one of the shafts may be eliminated. Another object is to provide a coupling device comprising an intermediate shaft having two coupling members secured thereon, these coupling members having driving connections with two other coupling members secured upon two substantially aligned shafts, and the intermediate floating shaft having bearings in parts carried by the other two shafts to permit a wide range of oscillation of the intermediate shaft without excessive wear. A further object is to provide a coupling adapted to connect two substantially aligned shafts and comprising parts of relatively small diameter arranged to provide a continuous annular bearing support for one of the shafts upon the other shaft, so that the shafts may have a considerable degree of angular misalignment without causing undue wear on the bearing parts. Other objects relate to various features of construction and arrangement which will appear more fully hereinafter.

The nature of the invention will be understood from the following specification taken with the accompanying drawings in which certain embodiments of the invention are illustrated. In the drawings, Figure 1 shows a side elevation of one embodiment of the present invention with parts thereof shown in longitudinal section;

Fig. 2 shows a sectional view on the line 2—2 of Fig. 1;

Fig. 3 shows a transverse sectional view on the line 3—3 of Fig. 2;

Fig. 4 is a longitudinal sectional view similar to that of Fig. 2, showing the relative positions of the parts after the intermediate floating shaft and the coupling members mounted thereon have been separated from the coupling members carried by the two substantially aligned shafts;

Fig. 5 is a longitudinal sectional view similar to that of Fig. 2 showing a modification of the invention; and Fig. 6 is a longitudinal sectional view similar to that of Fig. 2 showing a third form of the invention.

As illustrated in Figs. 1 to 4, inclusive, the invention comprises an intermediate floating shaft 10 interposed between two substantially aligned shafts 11 and 12 which are connected by the improved coupling device. Each of the shafts 11 and 12 has secured thereon a coupling device 13 comprising a hub portion 13a secured upon its shaft by a key 14 and having a radiating disk portion 13b to which there is secured a complementary disk portion 13c having a series of longitudinally extending jaws 13d projecting therefrom. The disk 13c and its jaws 13d are secured to the disk 13b of each coupling member 13 by a series of studs 15 which pass through apertures in the disk 13b and engage aligning threaded apertures 13e formed in the disk 13c and in the jaws 13d. The face of the disk 13b of each coupling member 13 is recessed as shown at 13f to receive the annular disk 13c, and when the studs 15 are in place, as shown in Fig. 2, a substantially unitary coupling member is provided.

The jaws 13d are adapted to intermesh loosely with a plurality of jaws 16d which extend longitudinally from the disk 16b of another coupling member 16 having a hub portion 16a which is secured upon the floating shaft 10 by a key 17. The jaws 13d and 16d carried by opposite coupling members are adapted to receive between them a plurality of separate power transmitting members 18 which are in the form of blocks formed of rubber, or rubber having fabric or the like embedded therein, or other suitable resilient deformable material capable of yielding when power is transmitted from one coupling member to the other.

The disk 16b of each coupling member 16 is provided with a series of holes 16e which are adapted to align with the holes 13e in the opposed coupling member so that the studs 15, after being removed from their normal engagement with the disks 13b may be inserted through the apertures 16e to engage the threaded apertures 13e and thereby draw the jaws 13d and the disk 13c into engagement with the coupling members 16, as shown in Fig. 4, thereby permitting relative lateral displacement of the floating shaft 10 and the coupling parts carried thereby without requiring relative endwise movement of the two shafts 11 and 12, a feature which may be of importance when it is impossible to move the shafts 11 and 12 in order to permit detachment of the coupling device. The members 18 are of such dimensions measured longitudinally of the shafts as to maintain a normal clearance 19 between the end faces of the jaws 13d and the adjacent face of the disk 16b, as shown in Fig. 2 so that when the jaws 13d have been clamped against the face of the disk 16, as shown in Fig. 4, the inner face of the disk 13c will clear all parts of the disk 13b.

Each jaw 13d is provided with opposite faces 13g which diverge longitudinally of the shaft 10 away from the disk 13c, and each jaw 16d is similarly provided with opposite faces 16g which lie in planes parallel to a plane containing the axis of the shaft 10. The faces 13g and 16g are adapted to coact with corresponding faces 18a and 18b, respectively, formed on one of the power transmitting members 18 and, due to the arrangement of the faces 13g and 18a, forces transmitted through the coupling will set up components which will tend to hold the members 18 in engagement with the face of the disk 13c while the faces 16g will permit relative movement of the shaft 10 and the coupling members 16 with respect to each of the coupling members 13.

Radial outward displacement of the power transmitting members 18 is prevented by cylindrical retaining rings 20, one of which is mounted on each coupling member 16. Each ring 20 projects over the jaws 13d and 16d and its inner surface is spaced slightly outward from these jaws, being engaged by the outer ends of the power transmitting members 18, as shown in Fig. 2, and a portion of each ring 20 fits over the outer annular surface of one of the disks 16b, being provided with an inwardly extending flange 20a which engages an annular recess 16h formed in the outer face of the disk 16b. Each disk 16b is provided with a series of threaded apertures 16i which are engaged by studs 21, and washers 22 are mounted beneath the heads of these studs to overlap the flanges 20a, thus holding the retaining ring 20 detachably in place on the coupling member.

Inward displacement of the power transmitting members 18 is prevented by an annular bearing or socket member 23 which is secured within the detachable portions 13c and 13b of each coupling member, as by welding its outer surfaces to the inner ends of the jaws 13d and to the surfaces of the annular notches 13h which are cut in the faces of the disks 13c. The shaft 10 is provided with portions 10a of reduced diameter in which are received the hubs 16a of the coupling members 16, and the extremities of the shaft 10 are still further reduced in diameter, as shown at 10b, to provide bearings for the bearing members 24 of circular cross section which seat within the bearing surfaces 23a of the socket members 23. A washer 25 is secured to each end of the shaft 10 by a stud 26 and the washer overlaps the outer face of the adjacent bearing member 24 to hold it in position on the shaft 10. Each bearing member 24 has an outer bearing surface 24a constituting a portion of a sphere and this surface is adapted to rock within the bearing surface 23a of the socket member, which latter bearing surface terminates adjacent the coupling member 16 in a portion 23b, of reduced diameter, so that endwise movement of the bearing members 24 away from the shafts 10 and 12 is limited, while the members 24 have a considerable range of movement in the opposite direction within the socket members 23.

With the arrangement of the parts described above, it will be apparent that the power transmitting members 18 rest at their inner ends upon the members 23 and that they are retained against outward movement by the members 20. Due to the clearances between the outer ends of jaws 13d and the inner faces of the members 20, a considerable degree of relative angular movement of the shaft 10 and either or both of the shafts 11 and 12 may take place, thus accommodating a substantial relative lateral displacement or misalignment of the two shafts 11 and 12. When such misalignment exists, the bearing members 24 are free to oscillate within the socket members 23 which serve as the sole supports for the floating shaft 10 and the coupling members 16. Due to the fact that the members 24 are of small diameter and to the fact that they have continuous annular bearings in the socket members 23, a substantial misalignment of the shafts may be compensated for without causing excessive wear on the parts 23 and 24. These parts may be formed of materials which will be adapted to withstand the wear to which they are subjected; for example, the bearing members 24 may be formed of steel and the surrounding socket members 23 may be formed of different material, such as cast iron or bronze. If desired, the inner annular bearing surface 23a of one of the socket members 23 may be formed as a continuous cylindrical surface throughout the length of the member, thus permitting free movement of the associated member 24 within that cylindrical surface. When it is desired to disassemble the coupling device, the studs 15 may be withdrawn from the positions shown in Fig. 2 and replaced in the positions shown in Fig. 4, thereby holding the disks 13c and the jaws 13d against the coupling members 16 so that the shaft 10 and the parts carried thereby may be moved freely in a lateral direction between the disks 13b and the shafts 11 and 12. When the studs 15 are thus reversed, the socket members 23 move toward the coupling members 16 and are carried thereby through the parts 13c and 13d so that the members 18 are retained in place between the jaws.

In Fig. 5 of the drawings, there is shown a modification of the invention in which an intermediate floating shaft 30 is mounted between two substantially aligned shafts 31 and 32 which are connected by couplings permitting the shaft 30 to oscillate with respect to the other shaft by which it is supported. Each of the shafts 31 and 32 has secured thereon a coupling member 33 comprising a hub portion 33a and a radial disk 33b to which there is detachably secured a complementary disk or ring 33c. The hub portion 33a is secured on its shaft by a key 34 and the disk or ring 33c of each coupling member is secured to the disk 33b by a series of studs 35 which pass through apertures in the disk 33b and engage threaded apertures 33e formed in the disk 33c and in the jaws 33d which extend longitudinally of the shafts from the disk 33c. The face of each disk 33b is recessed to provide an annular shoulder 33f which fits within the bore of the ring 33c.

The shaft 30 is reduced in diameter at each end, as shown at 30a, to receive the hub portion 36a of a coupling member 36 which is secured in place on the shaft by a key 37. Each coupling member 36 has a radially extending disk 36b formed integrally with the hub and having integral lugs or jaws 36d extending longitudinally therefrom to intermesh loosely with the jaws 33d. Each disk 36b is provided with apertures 36e which may be engaged by the studs 35 when these studs are removed from the disks 33b and reversed in position to clamp the jaws 33d against the disk 36b. A power transmitting member 38 formed of rubber or other resilient deformable material is interposed between each jaw 33d and the adjacent jaws 36d, as in the construction previously described, and these members 38 are held against radial outward movement by an annular retaining ring 40 of cylindrical form which fits over the disk 36b and is held in place by washers 41 secured to the disk by studs 42 and overlapping the annular flange 40a which extends inwardly from the margin of the retaining ring.

The construction shown in Fig. 5 differs from that previously described in that the inward movement of the power transmitting members 38 and the support of the ends of the floating shaft 30 are accomplished by a simplified form of construction including an annular bearing or socket member 43 which is secured to the inner ends of the jaws 33d and to the disk 33c by welding or the like. This bearing or socket member 43 has an annular inwardly extending rib 43a of inwardly convex cross section which bears upon the annular surface of one end portion 30a of the shaft 30. In this way, each end of the shaft 30 is journaled in a bearing, which permits it to rock and to move longitudinally to the extent which may be required by reason of the lack of alignment of the two shafts 31 and 32. This form of bearing construction may be provided at relatively small cost and the member 43 may be formed of material which is different from that of the shaft 30 so that the parts will have a long life and need not be frequently replaced.

In Fig. 6 of the drawings, there is shown a third form of the invention in which two shafts are connected by a single coupling. In this form, a shaft 50 is connected to a shaft 51 through a coupling comprising a coupling member 53 having a hub portion 53a secured on the shaft 51 by a key 54. The hub portion 53a is formed integrally with a radial disk 53b which is adapted to have secured thereto a complementary disk or ring 53c by means of studs 55 passing through apertures in the disk 53b and engaging threaded apertures 53e formed in the disk 53c and in the jaws 53d which extend longitudinally therefrom. The face of the disk 53b is recessed to provide an annular shoulder 53f which fits within the bore of the disk 53c.

The end of the shaft 50 adjacent the shaft 51 is reduced in diameter, as shown at 50a, to receive the hub portion 56a of a coupling member 56 which is secured on the shaft 50 by a key 57. The coupling member 56 has an integral radially extending disk 56b provided with a plurality of longitudinally extending lugs or jaws 56d which intermesh loosely with the jaws 53d carried by the other coupling member. The disk 56b is provided with a series of apertures 56e adapted to permit the reversal of the studs 55 for securing the jaws 53d and the disk 53c to the coupling member 56 when it is desired to effect the relative lateral separation of the shafts 50 and 51 and the parts carried thereby.

Between each jaw 53d and the next adjacent jaw 56d there is interposed a power transmitting member 58 in the form of a block of rubber or other suitable deformable resilient material, these blocks being of such dimensions that they maintain a clearance 59 between the end faces of the jaws and the opposed faces of the disks of the opposite coupling members. These blocks 58 are retained against outward movement by an annular retaining member 60 of cylindrical form which, as in the forms of the invention previously described, is secured in place on the disk 56b by means of washers 61 and studs 62. As in the constructions first described, the parts are so proportioned as to provide a clearance between the jaws 53d and the retaining member 60 to permit compensation for misalignment by the compression of the blocks 58.

The power transmitting members 58 are retained against inward movement by an annular bearing or socket member 63 which is secured to the inner surfaces of the jaws 53d and to portions of the annular disk 53c by welding or the like. This socket member 63 is in the form of a cylinder and its inner annular surface 63a is adapted to be engaged by the outer convex surface 64a of a bearing member 64 which is mounted upon the reduced extremity 50b of the shaft 50. The bearing member 64 is held in place by a washer 65 and a stud 66 which threadedly engages a hole in the end of the shaft.

At its other end the shaft 50 is reduced in diameter, as shown at 50c, to receive the inner sleeve 67a of a ball bearing unit 67 which has its outer sleeve 67b mounted in a bearing block 68. The balls 67c are mounted in raceways between the members 67a and 67b and the member 67a is secured on the reduced extremity of the shaft by a nut 70. Any self-aligning bearing may be used in place of the one just described.

The arrangement shown in Fig. 6 permits free oscillation of the end of the shaft 50 on which the bearing member 64 is mounted, and the extremity 50c of the shaft accommodates itself to this movement by reason of the ball bearing unit 67. In this way, the shaft 50, which may be the main shaft of a machine, for example, is permitted to oscillate freely and is supported at one end entirely by the shaft 51.

In any of the forms of the invention described above, the floating or oscillatory shaft is supported through a ball-and-socket connection, or its equivalent by the adjacent connected shaft or shafts, so that a wide degree of angular oscillation of the floating or oscillatory shaft is permitted while maintaining a centered relationship between the axes of the connected shafts at their ends.

Although certain forms of the invention have been shown and described by way of illustration, it will be understood that the invention may be constructed in various other embodiments coming within the scope of the appended claims.

I claim:

1. The combination in a coupling device for connecting two substantially aligned shafts, of an intermediate shaft of fixed length adapted to be interposed between said first named shafts, a pair of coupling members each adapted to be secured upon a separate one of said first named shafts, a second pair of coupling members each secured upon said intermediate shaft, means for forming a driving connection between each of said first named coupling members and one of said second named coupling members, and ball-and-socket means within which said intermediate shaft is supported to have free relative endwise movement with respect to said first named shafts.

2. The combination in a coupling device for connecting two substantially aligned shafts, of an intermediate shaft of fixed length adapted to be interposed between said first named shafts, a pair of coupling members each adapted to be secured upon a separate one of said first named shafts, a second pair of coupling members each secured upon said intermediate shaft, means for forming a driving connection between each of said first named coupling members and one of said second named coupling members, and socket members carried by said first named coupling members for receiving and closely fitting parts carried by said intermediate shaft and within which said parts of said intermediate shaft have free relative endwise movement.

3. The combination in a coupling device for connecting two substantially aligned shafts, of an intermediate shaft of fixed length adapted to be interposed between said first named shafts, a pair of coupling members each adapted to be secured upon a separate one of said first named shafts, a second pair of coupling members each secured upon said intermediate shaft, means for forming a driving connection between each of said first named coupling members and one of said second named coupling members, socket members carried by said first named coupling members, and ball members carried by said intermediate shaft to fit and angularly oscillate within said socket members—in any position longitudinally thereof, said socket members being constructed to allow axial movement of said ball members therein.

4. The combination in a coupling device for connecting two substantially aligned shafts, of an intermediate shaft of fixed length adapted to be interposed between said first named shafts, a pair of coupling members each adapted to be secured upon a separate one of said first named shafts, a second pair of coupling members each secured upon said intermediate shaft, means for forming a driving connection between each of said first named coupling members and one of said second named coupling members, and socket members carried by said first named coupling members and adapted to receive the ends of said intermediate shaft, said socket members having parts within which the end portions of said intermediate shaft have free oscillatory and endwise movements.

5. The combination in a coupling device for connecting two substantially aligned shafts, of an intermediate shaft of fixed length adapted to be interposed between said first named shafts, a pair of coupling members each adapted to be secured upon a separate one of said first named shafts, a second pair of coupling members each secured upon said intermediate shaft, means for forming a driving connection between each of said first named coupling members and one of said second named coupling members, and socket members which receive and support the ends of said intermediate shaft, said first named coupling members having separable parts on which said socket members are mounted, and means for attaching said separable parts to said second named coupling members, said coupling members and said separable parts being so constructed and arranged that said intermediate shaft and the parts carried thereby may be separated laterally with respect to the remaining portions of said first named coupling members when said attaching means are removed.

6. The combination with a pair of substantially aligned shafts, of a pair of coupling members each secured upon one of said shafts, means comprising separate loosely mounted power transmitting members for forming a driving connection between said coupling members and allowing for misalignment and relative endwise movement of said shafts, a socket member carried by one of said coupling members to receive and support the end of the shaft on which the other coupling member is mounted, said last named shaft having free endwise movement with respect to said socket member, and a self-aligning bearing for said last named shaft at a point removed from said coupling members.

LOUIS RICEFIELD.